July 4, 1967 M. L. SMITH 3,329,871

COLOR TELEVISION RECEIVER APPARATUS

Filed March 31, 1964 2 Sheets-Sheet 1

Marvin L. Smith
INVENTOR.

BY Richard E. Bee

ATTORNEY

Marvin L. Smith
INVENTOR.

BY Richard E. Bee
ATTORNEY 3,329,871
Patented July 4, 1967

3,329,871

COLOR TELEVISION RECEIVER APPARATUS

Marvin L. Smith, St. Joseph, Mich., assignor to Heath Company, St. Joseph, Mich., a corporation of Delaware Filed Mar. 31, 1964, Ser. No. 356,142
12 Claims. (Cl. 317—157.5)

This invention relates to color television receiver apparatus and, particularly, to such apparatus which uses a shadow-mask type of picture tube.

It is known that stray magnetic fields in the vicinity of a three-gun shadow-mask type of color television picture tube can upset the adjustment of the electron beams and cause distortion to appear in the form of improper colors in the reproduced image. Even relatively weak magnetic fields can cause noticeable amounts of distortion.

Unfortunately, many of the metal parts used in the construction of a color television receiver have a tendency to become slightly magnetized over a period of time. This includes some of the parts contained within the picture tube itself. When these parts are located near the paths of the electron beams, such stray magnetism can produce color distortion in the reproduced image.

In order to eliminate such stray magnetic fields, it is customary to "degauss" or "demagnetize" various portions of the receiver at various stages in its construction and assembly. Even when this is done, however, such stray magnetism may subsequently reappear after the receiver has been in use for a period of time. This requires a subsequent degaussing, which is usually performed by a serviceman or repairman using special degaussing apparatus.

In some cases, color television receivers are sold in the form of a kit of parts from which the purchaser himself assembles the complete receiver. In such cases it is usually desirable that various parts be degaussed during the assembly process.

It is an object of the invention, therefore, to provide new and improved color television receiver apparatus which enables degaussing of the receiver whenever necessary.

It is another object of the invention to provide new and improved color television receiver apparatus for enabling the set owner himself to perform the degaussing operation.

It is a further object of the invention to provide a safer and less expensive way of degaussing a color television receiver.

It is an additional object of the invention to provide new and improved apparatus for enabling a color television receiver sold in kit form to be degaussed during the assembly of the receiver.

In accordance with the invention, there is provided in a color television receiver the combination comprising a transformer having a primary winding adapted to be coupled to an alternating-current power source and a low-voltage secondary winding normally coupled to the other components in the receiver for supplying low-voltage power thereto. The combination also includes a movable circular loop type coil comprising a plurality of circular turns of insulated conductor wire and a pair of flexible lead wires connected to the free ends thereof. The combination further includes connector means for connecting the lead wires of the circular coil to the transformer secondary winding whereby the circular coil may be energized and used to degauss various portions of the color television receiver.

For a better understanding of the present invention, together with other and further objects thereof, reference is had to the following description taken in connection with the accompanying drawings, the scope of the invention being pointed out in the appended claims.

Referring to the drawings.

Figure 1:
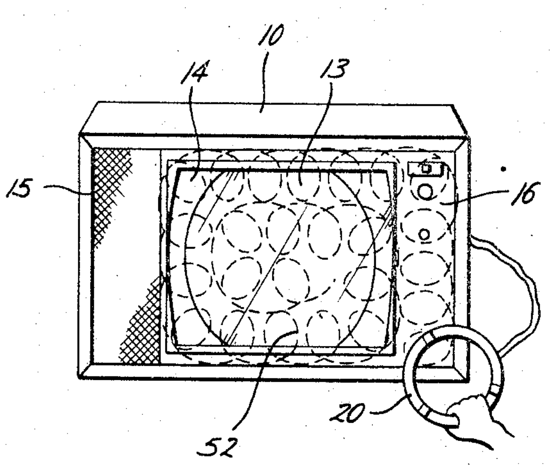
FIG. 1 is a front elevational view of a color television receiver.
Figures 2, 3:
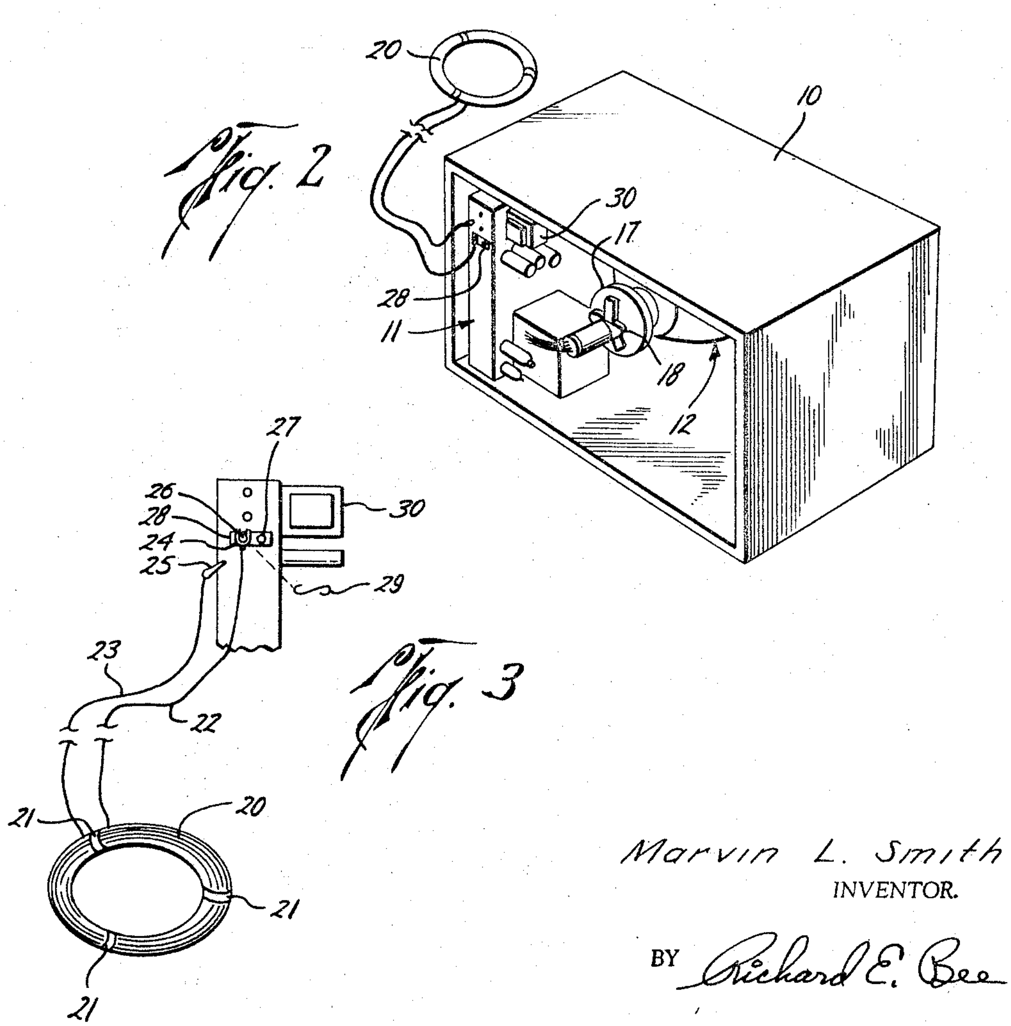
FIG. 2 is a rear view of the color television receiver of FIG. 1 with the back cover panel removed.
FIG. 3 is an enlarged view of a portion of FIG. 2 showing the parts pertinent to the present invention in greater detail.

Referring to FIGS. 1 and 2 of the drawings, there is shown a representative embodiment of a color television receiver, FIG. 1 showing a front elevational view of the receiver and FIG. 2 showing a rear view of the receiver with the protective cover panel removed. This color television receiver includes a cabinet 10 and, as seen in FIG. 2, a chassis 11 and a color picture tube 12 mounted inside of such cabinet. The front face 13 of the picture tube 12 is seen in the front view of FIG. 1. Also seen in FIG. 1 is a front panel mask 14 which frames the picture tube face 13, a covered loudspeaker enclosure 15 and a side panel 16 on which are mounted the various control knobs. The picture tube 12 is of the three-gun shadow-mask type and is capable of reproducing either a color image or a black-and-white image on the face plate 13, depending on the type of signal being sent from the broadcasting station. To this end, the receiver includes the usual deflection yoke 17 and convergence yoke 18 mounted on the neck of the picture tube 12 (FIG. 2) and the chassis 11 includes the various electron tubes and electronic circuits for processing the received broadcast signal and for driving the picture tube 12.

In accordance with the present invention, the color television receiver also includes a movable circular loop coil for degaussing portions of the color television receiver. In the representative embodiment illustrated in the drawings, this circular loop coil is represented by coil 20. Referring to FIG. 3, coil 20 comprises 30 turns of insulated conductor wire which are held together in a tight bundle by tape strips 21. The conductor wire for the turns of coil 20 is No. 18 gauge wire having a nominal diameter of 40.3 mils. The diameter of the circular loop formed by coil 20 is approximately 8 inches. Connected to the two free ends of the coil 20 are a pair of flexible lead wires 22 and 23. These lead wires 22 and 23 may be an integral part of the same conductor wire which is used to form the turns of coil 20. The free end of lead wire 22 is soldered to a spade lug 24, while the free end of lead wire 23 is soldered to an alligator clip 25.

The means for connecting the degaussing coil 20 to the remainder of the receiver includes a pair of connector terminals 26 and 27 mounted on an insulated terminal strip 28 which, as seen in FIG. 3, is in turn mounted on the back of the chassis 11. Connector terminals 26 and 27 are of the adjustable screw type wherein a screwdriver may be used for loosening or tightening the screw to enable the disconnecting or connecting of wires or lugs thereto. A removable conductor in the form of a jumper wire 29 is also provided for connection between connector terminals 26 and 27 during appropriate stages in the operation of the receiver.

Figure 4:
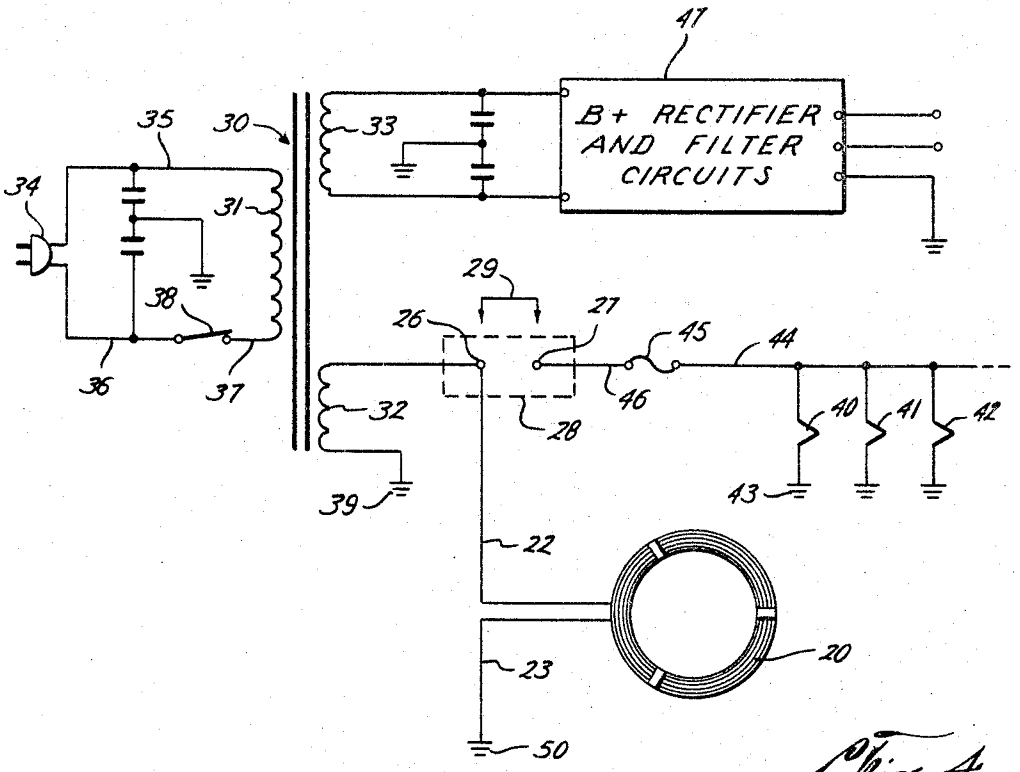
FIG. 4 is a circuit diagram, partly schematic, of the portion of the color television receiver which is pertinent to the present invention.

Referring now to FIG. 4 of the drawings, there is shown a circuit diagram for the main power supply portion of the color television receiver. As there seen, the receiver includes a power transformer 30 having a primary winding 31 and a pair of secondary windings 32 and 33. A plug 34 is adapted to be plugged into a 110-volt alternating-current wall outlet. Plug 34 is connected to the primary winding 31 by means of conductor wires 35, 36 and 37 and on-off switch 38. Consequently, when plug 34 is plugged into the wall outlet and switch 38 is closed, 110-volt alternating current is supplied to the primary winding 31.

Secondary winding 32 is a low-voltage secondary winding which is normally used to energize the heater filaments of various electron tubes mounted on the chassis 11. In the present embodiment, the step-down ratio between primary winding 31 and secondary winding 32 is constructed to provide a voltage of 6.3 volts across secondary winding 32. One end of the secondary winding 32 is connected to chassis ground as indicated at 39, while the other end is connected to connector terminal 26.

The heater filaments for representative ones of the electron tubes are represented by elements 40, 41 and 42. One end of each heater filament is connected to chassis ground as indicated at 43. The other end of each of the heater filaments 40, 41 and 42 is connected to the connector terminal 27 by means of a conductor wire 44, a fuse 45 and a conductor wire 46.

The secondary winding 33 is a high-voltage secondary winding and is connected to B+ rectifier and filter circuits 47 for energizing these circuits so that they can develop the appropriate direct-current voltages used in the operation of the receiver.

During the normal operation of the receiver, the jumper wire 29 is connected between the connector terminals 26 and 27 and the degaussing coil 20 is disconnected from the receiver. During such time, the transformer secondary winding 32 operates to energize the electron tube heater filaments, indicated by representative filaments 40, 41 and 42, and the color television receiver operates in a normal manner to reproduce the televised image.

Whenever the picture tube or other parts of the receiver which are normally unmagnetized become sufficiently magnetized over a period of time to produce noticeable distortion in the reproduced image, it becomes necessary to degauss or demagnetize the picture tube or such other parts. In the case of picture tube magnetization, this color distortion frequently takes the form of small areas of the picture becoming predominantly one color and this is especially noticeable when viewing black-and-white pictures.

In order to perform the degaussing operation, the connector terminals 26 and 27 are loosened and the jumper wire 29 is removed. This disconnects the heater filaments 40, 41 and 42 from the power transformer secondary winding 32. The degaussing coil 20 is then connected to the secondary winding 32 by placing the lug 24 on the connector terminal 26 and tightening the screw and by connecting the alligator clip 25 to the chassis 11. These connections are shown in FIG. 3. The chassis ground connection provided by the alligator clip 25 is indicated at 50 in FIG. 4. The degaussing coil 20 is then energized with alternating current by closing the main on-off switch 38 for the receiver. The degaussing operation is then performed by moving the degaussing coil 20 with small circular motions near the object to be degaussed. This movement is indicated in FIG. 1 by the broken line 52 for the case of degaussing the front face and shadow-mask of the picture tube as well as the front panel mask 14 and control knob panel 16 of the receiver. During this circular movement, the degaussing coil 20 should be kept parallel to and at a distance of about one or two inches from the objects being degaussed.

When the degaussing operation has been completed, the coil 20 is then moved as far from the receiver as the lead wires 22 and 23 will permit. The degaussing coil 20 is then de-energized by opening the on-off switch 38. The coil 20 is then disconnected from the receiver by removing lug 24 from terminal 26 and removing the alligator clip 25 from the chassis 11. The jumper wire 29 is then replaced between terminals 26 and 27 and the terminal screws retightened. The receiver is then ready to resume normal operation.

Figure 5:
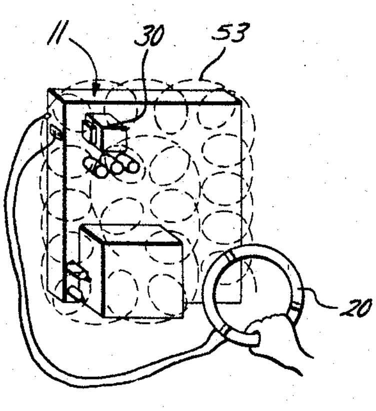
FIG. 5 is a perspective view of a portion of the receiver showing how the present invention may be used during the assembly thereof.

FIG. 5 represents the case where a color television receiver is assembled from a kit of parts and it is desired to degauss various portions of the receiver during the assembly thereof. The particular case illustrated in FIG. 5 is that where the chassis 11 is to be degaussed before it is mounted inside the cabinet 10 and connected to the picture tube 12. In this case, at some appropriate point after the power supply circuits are assembled, the degaussing coil 20 is connected to the low-voltage secondary winding 32 of the power transformer 30 and the degaussing operation performed in a manner similar to that previously indicated. Typical circular motions for the degaussing of the chassis 11 are indicated by broken line 53.

One precaution that should be observed during the degaussing operation is that care should be used not to place the degaussing coil too close to any permanent magnets, such as those contained in the convergence yoke or in the loudspeaker, lest such magnets be either wholly or partially demagnetized.

A particular advantage of the color television apparatus of the present invention is that the degaussing feature is provided at very little increase in the cost of the receiver. Also, there is no appreciable shock hazard in the use of the degaussing coil because such coil is energized by a voltage of relatively low value. A further advantage is that a degaussing operation may be readily and easily performed by the set owner himself, thus saving the expenses which are usually attendant when resort is had to a professional serviceman or repairman.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a color television receiver, the combination comprising:

a transformer having a primary winding adapted to be coupled to an alternating-current power source and a low-voltage secondary winding normally coupled to other components in the receiver for supplying low-voltage power thereto;

a movable circular loop type coil comprising a plurality of circular turns of insulated conductor wire and a pair of flexible lead wires connected to the free ends thereof;

and connector means for connecting the lead wires of the circular coil to the transformer secondary winding whereby the circular coil may be energized and used to degauss various portions of the color television receiver.

2. In a color television receiver, the combination comprising:

circuit means for supplying alternating-current power;

a transformer having a primary winding coupled to the supply circuit means and a low-voltage secondary winding normally coupled to other components in the receiver for supplying low-voltage power thereto;

a movable circular loop type coil comprising a plurality of circular turns of insulated conductor wire and a pair of flexible lead wires connected to the free ends thereof;

and connector means for connecting the lead wires of the circular coil to the transformer secondary winding whereby the circular coil may be energized and used to degauss various portions of the color television receiver.

3. In a color television receiver, the combination comprising:

a transformer having a primary winding adapted to be coupled to an alternating-current power source and a low-voltage secondary winding normally coupled to the heater filaments of electron tubes in the receiver for supplying low-voltage power thereto;

a movable circular loop type coil comprising a plurality of circular turns of insulated conductor wire and a pair of flexible lead wires connected to the free ends thereof;

and connector means for connecting the lead wires of the circular coil to the transformer secondary winding whereby the circular coil may be energized and used to degauss various portions of the color television receiver.

4. In a color television receiver, the combination comprising:

a transformer having a primary winding adapted to be coupled to an alternating-current power source and a low-voltage secondary winding normally coupled to other components in the receiver for supplying low-voltage power thereto;

a movable circular loop type coil, the loop of which is at least six inches in diameter, comprising a plurality of circular turns of insulated conductor wire and a pair of flexible lead wires connected to the free ends thereof;

and connector means for connecting the lead wires of the circular coil to the transformer secondary winding whereby the circular coil may be energized and used to degauss various portions of the color television receiver.

5. In a color television receiver, the combination comprising:

a transformer having a primary winding adapted to be coupled to an alternating-current power source and a low-voltage secondary winding normally coupled to other components in the receiver for supplying low-voltage power thereto;

a movable circular loop type coil comprising approximately thirty turns of insulated conductor wire and a pair of flexible lead wires connected to the free ends of the coil;

and connector means for connecting the lead wires of the circular coil to the transformer secondary winding whereby the circular coil may be energized and used to degauss various portions of the color television receiver.

6. In a color television receiver, the combination comprising:

a transformer having a primary winding adapted to be coupled to an alternating-current power source and a low-voltage secondary winding normally coupled to other components in the receiver for supplying low-voltage power thereto;

a movable circular loop type coil, the loop of which is at least six inches in diameter, comprising approximately thirty turns of insulated conductor wire having a wire diameter of approximately forty mils and a pair of flexible lead wires connected to the free ends of the coil;

and connector means for connecting the lead wires of the circular coil to the transformer secondary winding whereby the circular coil may be energized and used to degauss various portions of the color television receiver.

7. In a color television receiver, the combination comprising:

a transformer having a primary winding adapted to be coupled to an alternating-current power source and a 6.3 volt secondary winding normally coupled to other components in the receiver for supplying 6.3 volt power thereto;

a movable circular loop type coil, the loop of which is approximately eight inches in diameter, comprising approximately thirty turns of insulated conductor wire having a wire diameter of approximately forty mils and a pair of flexible lead wires connected to the free ends of the coil;

and connector means for connecting the lead wires of the circular coil to the transformer secondary winding whereby the circular coil may be energized and used to degauss various portions of the color television receiver.

8. In a color television receiver, the combination comprising:

a transformer having a primary winding adapted to be coupled to an alternating-current power source and a a low-voltage secondary winding normally coupled to other components in the receiver for supplying low-voltage power thereto;

a movable circular loop type coil comprising a plurality of circular turns of insulated conductor wire and a pair of flexible lead wires connected to the free ends thereof;

and adjustable connector means for disconnecting the other receiver components from the transformer secondary winding and for connecting the lead wires of the circular coil to the transformer secondary winding whereby the circular coil may be energized and used to degauss various portions of the color television receiver.

9. In a color television receiver, the combination comprising:

circuit means for supplying alternating-current power;

a transformer having a primary winding coupled to the supply circuit means and a low-voltage secondary winding normally coupled to the heater filaments of electron tubes in the receiver for supplying low-voltage power thereto;

a movable circular loop type coil comprising a plurality of circular turns of insulated conductor wire and a pair of flexible lead wires connected to the free ends thereof;

and adjustable connector means for disconnecting the heater filaments from the transformer secondary winding and for connecting the lead wires of the circular coil to the transformer secondary winding whereby the circular coil may be energized and used to degauss various portions of the color television receiver.

10. In a color television receiver, the combination comprising:

circuit means for supplying 110-volt alternating-current power;

a power transformer having a primary winding coupled to the supply circuit means and a 6.3 volt secondary winding normally coupled to the heater filaments of electron tubes in the receiver for supplying 6.3 volt power thereto;

a movable circular loop type coil, the loop of which is approximately eight inches in diameter, comprising approximately thirty turns of insulated conductor wire having a wire diameter of approximately forty mils and a pair of flexible lead wires connected to the free ends of the coil;

and adjustable connector means for disconnecting the heater filaments from the transformer secondary winding and for connecting the lead wires of the circular coil to the transformer secondary winding whereby the circular coil may be energized and used to degauss various portions of the color television receiver.

11. In a color television receiver, the combination comprising:

circuit means for supplying alternating-current power;

a power transformer having a primary winding and a secondary winding, the primary winding being coupled to the supply circuit means and one end of the secondary winding being connected to ground;

a plurality of electron tubes having individual heater filaments, one end of each filament being connected to ground;

a pair of connector terminals, a first of which is connected to the other end of the transformer secondary winding and a second of which is connected to the other ends of the heater filaments;

a movable circular loop coil for degaussing portions of the color television receiver;

means for connecting the circular loop coil between the first connector terminal and ground during the degaussing operation;

and a removable conductor adapted to be connected between the first and second connector terminals during the normal operation of the receiver.

12. In a color television receiver, the combination comprising:

circuit means for supplying alternating-current power;

a power transformer having a primary winding and a secondary winding, the primary winding being coupled to the supply circuit means and one end of the secondary winding being connected to ground;

a plurality of electron tubes having individual heater filaments, one end of each filament being connected to ground;

a pair of connector terminals, a first of which is connected to the other end of the transformer secondary winding and a second of which is connected to the other ends of the heater filaments;

a movable circular loop coil for degaussing portions of the color television receiver, the loop of the coil being at least six inches in diameter and the coil comprising approximately thirty turns of insulated conductor wire;

means for connecting the circular loop coil between the first connector terminal and ground during the degaussing operation;

and a removable conductor adapted to be connected between the first and second connector terminals during the normal operation of the receiver.

References Cited

UNITED STATES PATENTS

| | | | |
|---|---|---|---|
| 2,962,621 | 9/1960 | Fernald | 315—8 |

OTHER REFERENCES

RCA publication, The 700 Series, "Color Television Receivers," 1956 pp. 44, 45.

MILTON O. HIRSHFIELD, *Primary Examiner.*

J. A. SILVERMAN, *Assistant Examiner.*